(12) United States Patent
Lyons et al.

(10) Patent No.: US 7,404,658 B1
(45) Date of Patent: Jul. 29, 2008

(54) LIGHT BAR SNAP BRACKET ASSEMBLY

(75) Inventors: Jon H. Lyons, Haddam, CT (US); Jeffrey A. Nelson, Haddam, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 0 days.

(21) Appl. No.: 11/879,840

(22) Filed: Jul. 19, 2007

(51) Int. Cl.
*B60Q 1/26* (2006.01)
(52) U.S. Cl. .................. 362/542; 362/493; 362/544; 362/549; 362/238; 362/250; 340/468; 340/471; 340/472
(58) Field of Classification Search .......... 340/468, 340/471, 472, 473; 362/219, 238, 239, 240, 362/249, 250, 252, 493, 523, 542–545, 548, 362/549
See application file for complete search history.

(56) References Cited

U.S. PATENT DOCUMENTS

| | | | |
|---|---|---|---|
| 4,620,268 A * | 10/1986 | Ferenc | 362/219 |
| 6,722,776 B1 * | 4/2004 | Lyons et al. | 362/493 |
| 6,863,424 B2 * | 3/2005 | Smith | 362/542 |

OTHER PUBLICATIONS

Drawing of Assembly, Lightbar 4500 Series LED (45KKKRL) Part No. 01-0684015-00; Dwg No. 84015, Sheet 1 of 4, © 2003 Whelen Eng. Co. Inc., Chester, CT.
Installation Guide: Dominator™/ Flasher Series, 3 pages, © 2004 Whelen Engineering Company Inc., Chester, CT.

* cited by examiner

*Primary Examiner*—Stephen F Husar
(74) *Attorney, Agent, or Firm*—Alix, Yale & Ristas, LLP

(57) ABSTRACT

A light bar snap bracket assembly includes an elongated rail member, multiple light modules, and multiple snap brackets. The light modules are disposed within the rail member channel in a line of light modules extending longitudinally from a first light module disposed at the first end of the rail member to a last light module disposed at the second end of the rail member, the line of light modules defining pairs of adjacent light modules. One of the snap brackets is disposed intermediate each light module in each pair of light modules, one of the snap brackets is disposed intermediate the first light module and the first end of the rail member, and one of the snap brackets is disposed intermediate the last light module and the second end of the rail member. Arm segments of each snap bracket extend longitudinally over tabs extending from the light module sides, of the adjacent light module half portion, with the tabs being received within the notches of the arm segments. Catches on the snap brackets engage shoulders of the rail member whereby the snap brackets lock the light modules to the rail member.

22 Claims, 8 Drawing Sheets

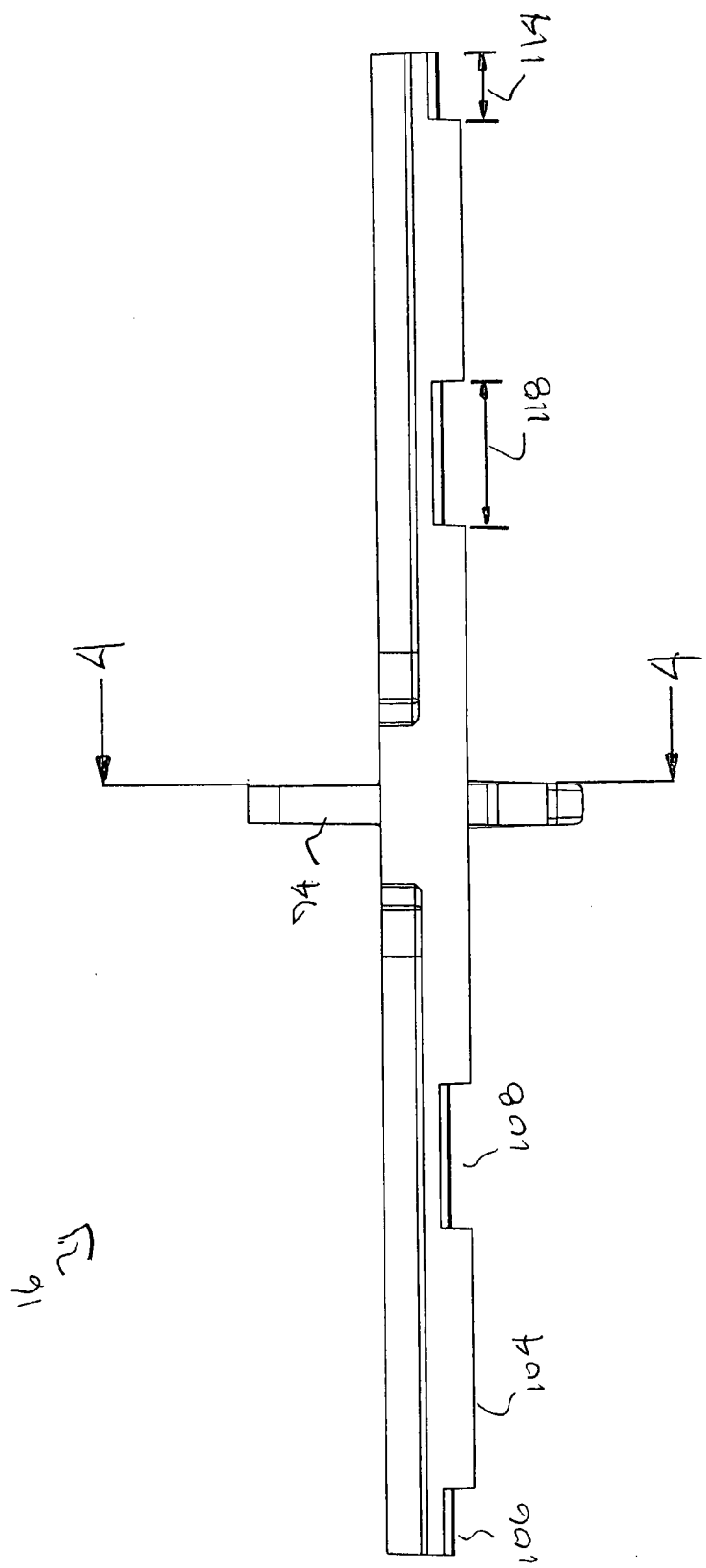

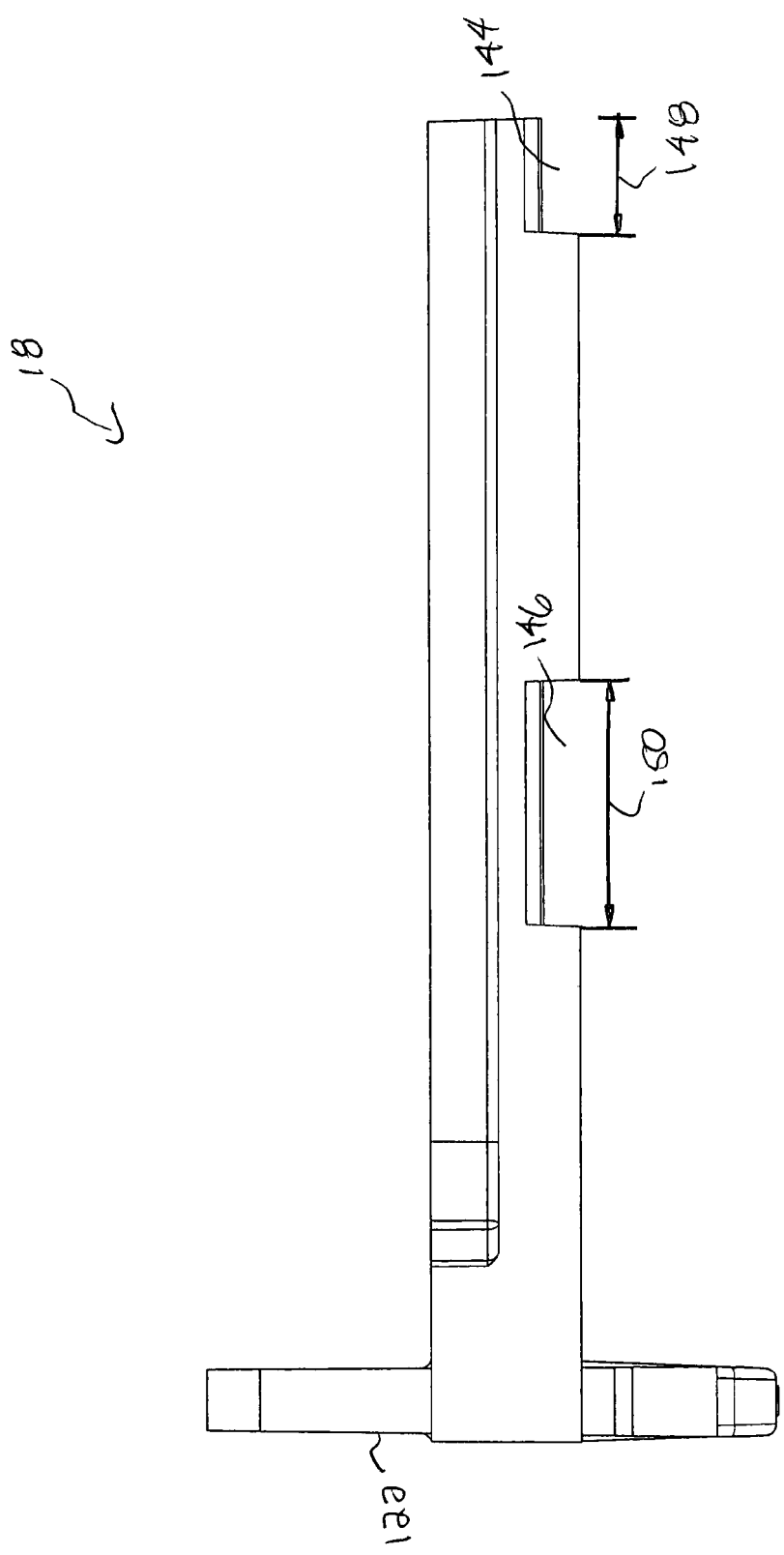

LIGHT BAR SNAP BRACKET ASSEMBLY

BACKGROUND

This disclosure relates generally to warning light systems for installation on land and marine vehicles. More particularly, the present disclosure relates to a light bar warning light system for installation on land and marine vehicles.

Warning light assemblies in the form of light bars mounted on emergency vehicles are well known in the art. Some of these light bars include a housing enclosing a rail member to which warning light modules are mounted. Other light bars do not include a housing, with the rail member and warning light modules mounted thereon being exposed to the weather. Generally, the warning light modules are manually positioned on the rail member and manually mounted to the rail member. In one conventional light bar, portions of the warning light modules are received in longitudinally extending slots in the rail member, and an operator must slide each warning light module into position on the rail member.

Thus it is desirable that a light bar be designed whereby the warning light modules may be positioned and mounted to the rail member by machine.

SUMMARY

There is provided a light bar snap bracket assembly comprising an elongated rail member, multiple light modules, and multiple snap brackets. The rail member includes first and second sidewalls forming a channel extending from a first end of the rail member to a second end of the rail member. First and second, oppositely disposed shelves extend laterally from the sidewalls into the channel. Each of the shelves have an upper surface and a lower shoulder. Each light module includes oppositely disposed, longitudinally extending first and second sides. At least one tab extends laterally from each side, with each of the tabs having upper and lower surfaces. Each snap bracket includes a web segment having oppositely disposed first and second ends, first and second resilient members disposed adjacent the first and second ends, respectively, and a catch extending laterally outward from each resilient member. First and second arm segments extend substantially orthogonally from the first and second ends of the web segment, respectively. Each of the arm segments have a lower edge defining at least one notch. The light modules are disposed within the rail member channel in a line of light modules extending longitudinally from a first light module disposed at the first end of the rail member to a last light module disposed at the second end of the rail member, the line of light modules defining pairs of adjacent light modules. The lower surfaces of the tabs contact the upper surfaces of the shelves. One of the snap brackets is disposed intermediate each light module in each pair of light modules, one of the snap brackets is disposed intermediate the first light module and the first end of the rail member, and one of the snap brackets is disposed intermediate the last light module and the second end of the rail member. The first and second arm segments of each snap bracket extend longitudinally over the tab of the first and second sides, respectively, of the light module half portion adjacent the snap bracket web segment, with the tabs of the first and second light module sides being received within the notches of the first and second arm segments, respectively. The catches of the web segment resilient members engage the lower shoulders of the rail member shelves whereby the snap brackets lock the light modules to the rail member.

Each light module includes an upper portion, a lower portion, and a plurality of tabs extending laterally from the sides the light module intermediate the upper and lower portions. Each of the snap bracket resilient members includes an inner portion that extends upwardly from a center part of the web segment and an outer portion that extends downwardly from the inner portion through an opening of the web segment. Each of the snap bracket resilient members also includes a cam surface extending obliquely downward from the catch.

The snap brackets disposed intermediate each light module in each pair of light modules are H-shaped intermediate snap brackets. The web segment first and second ends are disposed at a position intermediate the first and second ends of the first and second arm segments, respectively.

Each of the arm segments has a first end notch extending longitudinally from the first end, a second end notch extending longitudinally from the second end, a first intermediate notch disposed intermediate the first end notch and the web segment, and a second intermediate notch disposed intermediate the second end notch and the web segment. Each side of the light module has first and second end tabs and a middle tab disposed intermediate the end tabs. The intermediate snap bracket end notches have a length that is substantially one-half the length of the middle tabs and the intermediate snap bracket intermediate notches have a length that is substantially equal to the length of the end tabs.

The snap bracket disposed intermediate the first light module and the first end of the rail member and the snap bracket disposed intermediate the last light module and the second end of the rail member are each an end snap bracket. The first and second arm segments of each end snap bracket have oppositely disposed first and second ends the web segment first and second ends being disposed adjacent the first end of each arm segment.

Each of the end snap bracket arm segments has an end notch extending longitudinally from the first end and an intermediate notch disposed intermediate the end notch and the web segment. Each side of the light module has first and second end tabs and a middle tab disposed intermediate the end tabs. The end snap bracket end notches have a length that is substantially one-half the length of the middle tabs and the end snap bracket intermediate notches have a length that is substantially equal to the length of the end tabs.

There is also provided a method of manufacturing a light bar assembly, the light bar assembly having one or more light modules mounted to an elongated rail member by multiple of snap brackets. Each light module includes oppositely disposed, longitudinally extending first and second sides, with at least one tab extending laterally from each side. The rail member includes first and second sidewalls defining a channel extending from a first end of the rail member to a second end of the rail member. First and second, oppositely disposed shelves extend laterally from the sidewalls into the channel. Each of the shelves has an upper surface and a lower shoulder. Each of the snap brackets includes a web segment having oppositely disposed first and second ends, first and second resilient members disposed adjacent the first and second web segment ends, respectively, and first and second arm segments extending substantially orthogonally from the first and second ends of the web segment, respectively. Each of the arm segments has a lower edge defining at least one notch. The method comprises: A) positioning a first of the light modules in the rail member channel adjacent the rail member first end, with the lower surfaces of the light module tabs engaging the upper surface of the rail shelves; B) positioning a snap bracket between the rail member first end and the light module; C)

pushing the snap bracket toward the rail member until the light module tabs are received by the snap bracket first and second arm segment notches and a catch extending laterally outward from each resilient member is disposed below the rail shoulder thereby installing the light module; and D) determining whether a subsequent light module must be mounted to the rail member. If a subsequent light module must be mounted to the rail member, the subsequent light module is positioned in the rail member channel adjacent the installed light module: one of the snap brackets is positioned between the installed light module and the subsequent light module; the snap bracket is pushed toward the rail member until the light module tabs of the installed light module and the subsequent light module are received by the snap bracket first and second arm segment notches and the catch of each resilient member is disposed below the rail shoulder thereby installing the subsequent light module, then step D is performed again. If a subsequent light module must not be mounted to the rail member, one of the snap brackets is positioned between the rail member second end and the installed light module, and the snap bracket is pushed toward the rail member until the light module tabs are received by the snap bracket first and second arm segment notches and the of each resilient member is disposed below the rail shoulder thereby completing manufacturing of the light bar assembly.

BRIEF DESCRIPTION OF THE DRAWINGS

The present disclosure may be better understood and its numerous objects and advantages will become apparent to those skilled in the art by reference to the accompanying drawings in which:

FIG. 3 is an enlarged side view of the intermediate snap bracket of FIG. 1;

FIG. 5 is an enlarged side view of the end snap bracket of FIG. 1;

DETAILED DESCRIPTION

Figure 1:
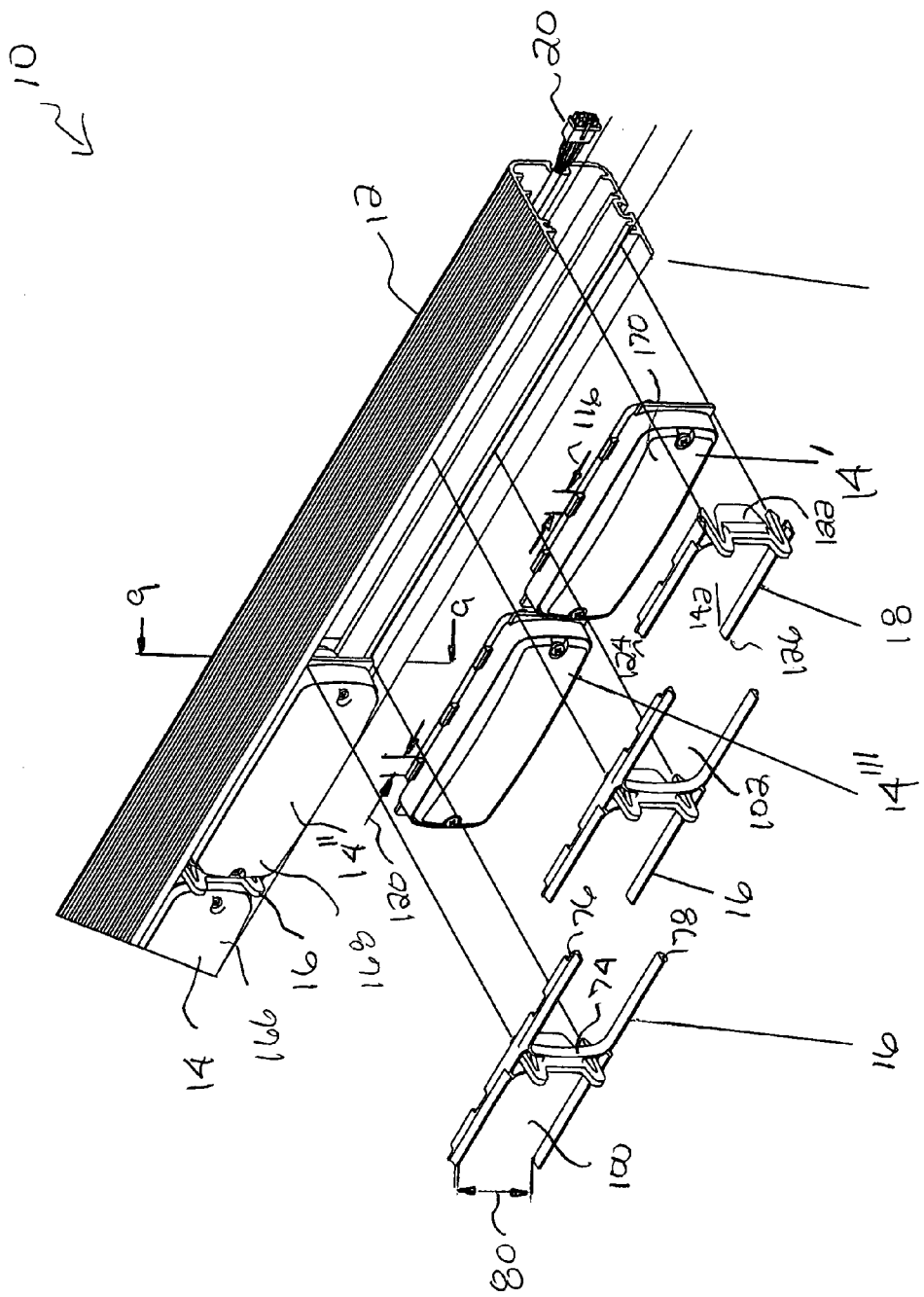
FIG. 1 is a perspective view of a partially assembled light bar snap bracket assembly in accordance with the disclosure.

With reference to the drawings wherein like numerals represent like parts throughout the several figures, a light bar snap bracket assembly 10 is a component of a warning light system that may be installed on land or marine vehicles. The warning light system may include a housing that surrounds the light bar snap bracket assembly 10 and a base member for mounting the warning light system to the vehicle. Alternatively, the warning light system may not include a housing, with the light bar snap bracket assembly 10 being exposed to the weather. The light bar snap bracket assembly 10 includes an elongated rail 12, light modules 14, snap brackets 16, 18 that mount the light modules 14 to the rail 12, and a wiring harness 20 connecting the light modules 14 to a power supply (not shown).

Figure 2:
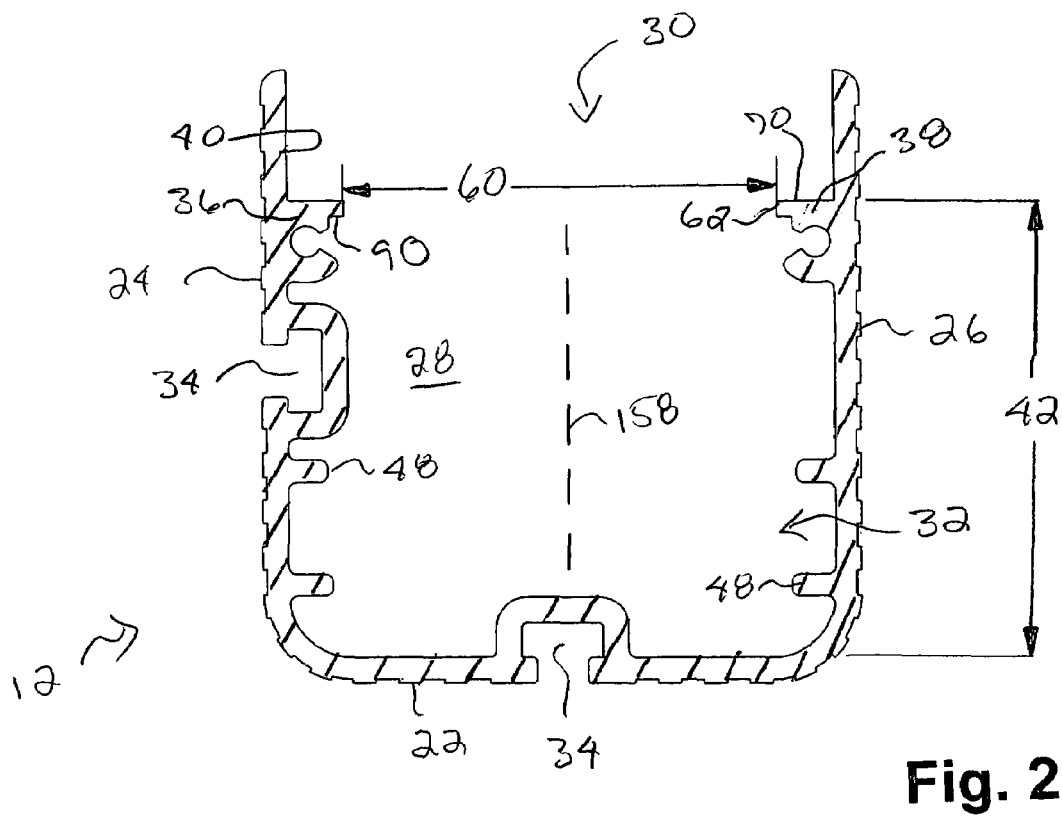
FIG. 2 is an enlarged cross-sectional view of the rail of FIG. 1.

With reference to FIG. 2, the rail 12 is preferably an aluminum extrusion, although other suitable materials and methods of manufacture may be used. The rail 12 has a U-shape, with a base 22 connecting first and second sidewalls 24, 26. The U-shape of the rail 12 forms a channel 28 having an outer portion 30, for receiving the light modules 14 and snap brackets 16, 18, and an inner portion 32 for receiving the wiring harness 20. The rail 12 may include one or more longitudinally extending T-slots 34 for mounting the rail 12 to the base member or another structural member of the warning light system, as is known in the art. First and second, oppositely disposed shelves 36, 38 extend laterally from the inner surface 40 of the rail sidewalls 24, 26, into the outer portion 30 of channel 28, and longitudinally the length of the rail 12. The first and second shelves 36, 38 are configured to support the light modules 14. The shelves 36, 38 are positioned at a predetermined distance 42 from the base 22 whereby the rear surface 44 of the light modules 14 supported on the shelves 36, 38 are located at a sufficient distance 46 (FIG. 9) from the base 22 to allow channel inner portion 32 to receive the wiring harness 20. A number of other protrusions 48 may extend laterally from the inner surface 40 of the rail sidewalls 24, 26 and longitudinally the length of the rail 12 to provide additional mechanical strength to the rail 12.

Figure 7:
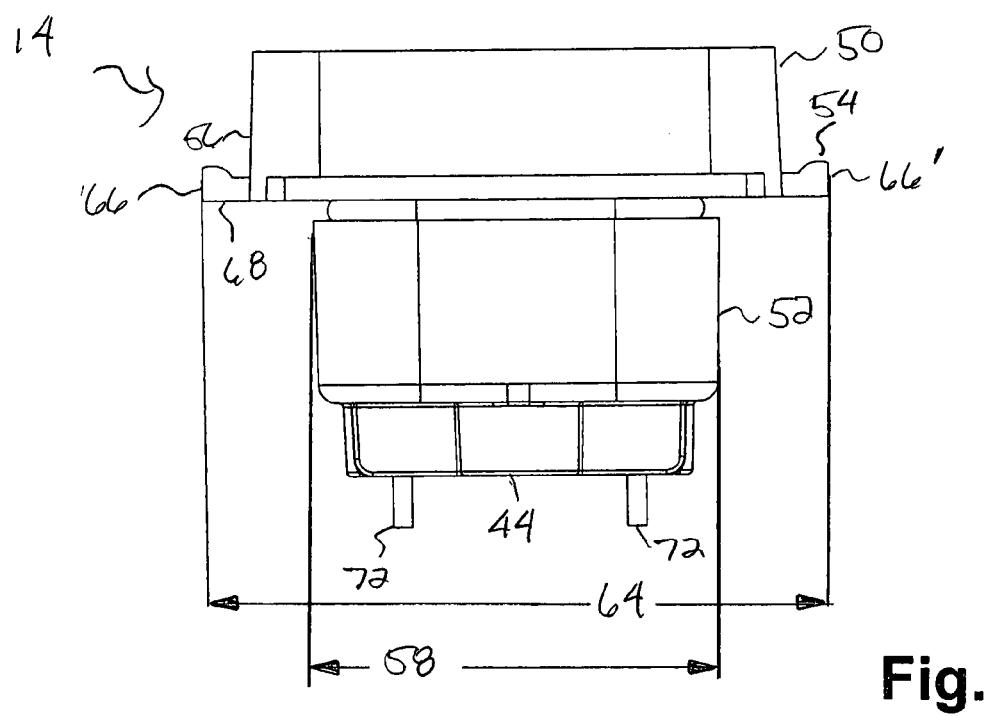
FIG. 7 is an enlarged end view of the light module of FIG. 1.
Figure 8:
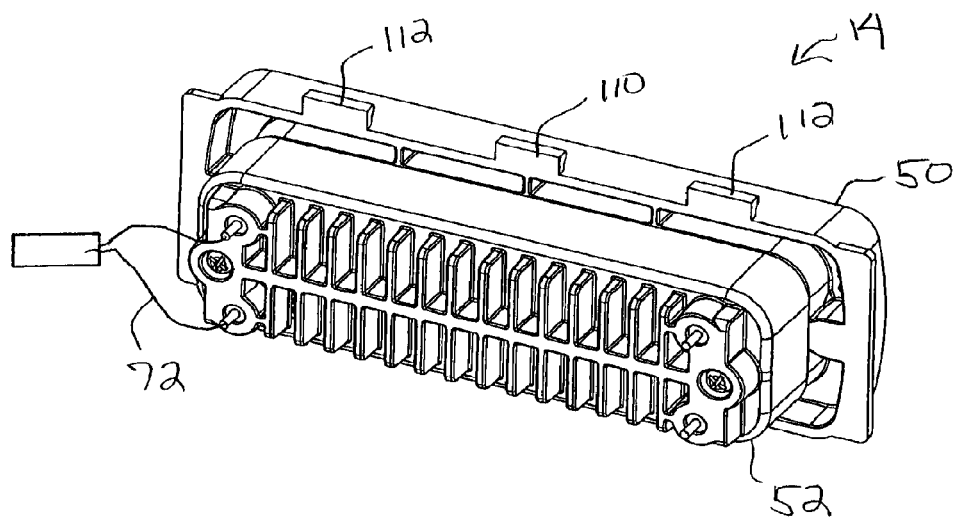
FIG. 8 is a rear perspective view of the light module of FIG. 7.

As shown in FIG. 1, each light bar snap bracket assembly 10 generally includes multiple light modules 14 that are arranged in a line of adjacent light modules 14. With additional reference to FIGS. 7 and 8, each light module 14 includes an upper portion 50, a lower portion 52, and multiple tabs 54 extending laterally from the sides 56 the light module 14 intermediate the upper and lower portions 50, 52. The width 58 of the light module lower portion 52 is less than the distance 60 between the edges 62 of the rail shelves 36, 38, such that the light module lower portion 52 is easily inserted between the rail shelves 36, 38. The distance 64 between the laterally outer edges 66 of tabs 54 on one side of the light module 14 and the laterally outer edges 66' of the tabs 54 of the other side of the light module 14 is greater than the distance 60 between the edges 62 of the rail shelves 36, 38. Accordingly, the lower surface 68 of the tabs 54 engage the upper surface 70 of the rail shelves 36, 38 whereby a light module 14 mounted to the rail 12 is supported on the rail shelves 36, 38. A pair of wires 72 may extend from the light module lower portion 52 for connection to the wiring harness 20.

A combination of two types of snap brackets are used to mount the light modules 14 to the rail 12, with an intermediate snap bracket 16 being positioned between each pair of adjacent light modules 14 and an end snap bracket 18 being positioned at the free end of each end light module 14.

Figure 4:
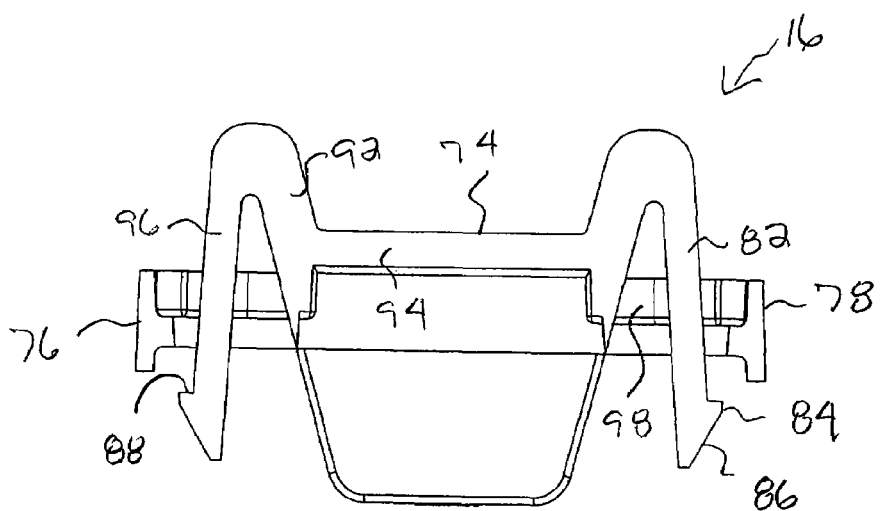
FIG. 4 is a cross-sectional view of the intermediate snap bracket taken along lines 4-4 of FIG. 3.
Figure 9:
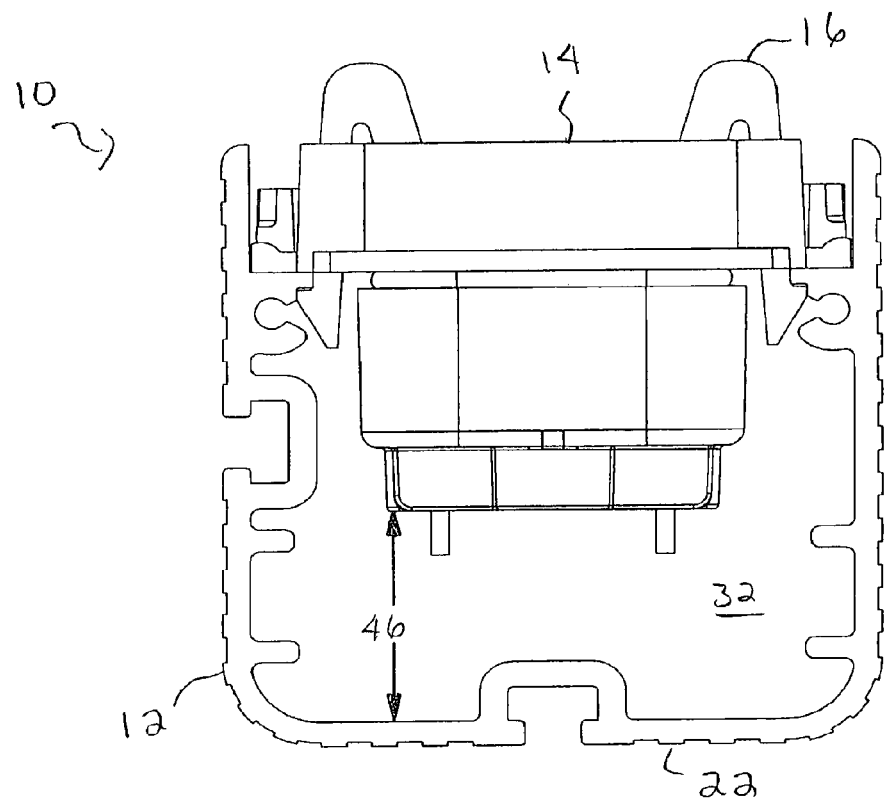
FIG. 9 is a cross-sectional view taken along line 9-9 of FIG. 1.

With reference to FIGS. 1, 3 and 4, each H-shaped intermediate snap bracket 16 has a web segment 74 connecting first and second arm segments 76, 78. The first arm segment 76 is positioned at a distance 80 from the second arm segment 78 such that the upper portion 50 of a light module 14 may be received therebetween. The web segment 74 includes a pair of downwardly extending resilient members 82, with one of the resilient members 82 being disposed adjacent each of the arm segments 76, 78. A catch 84 extends laterally outward from each resilient member 82. A cam surface 86 extends obliquely downward from the catch 84. As shown in FIG. 9, an upper contact surface 88 of the catch 84 engages a shoulder 90 of the rail shelf 36, 38 when the snap bracket 16 is installed. In the embodiment shown in the Figures, each resilient member 82 includes an inner portion 92, that extends upwardly from a center part of the web segment 74, and an outer portion 96 that extends downwardly from the inner portion 92 and through an opening 98 intermediate the web center part 94 and the arm segment 76, 78. This structure provide sufficient flexibility to the resilient member 82 to facilitate installation while providing sufficient resiliency to ensure that the catch 84 is biased to a position under the rail shelf 36, 38 whereby the catch contact surface 88 engages the rail shoulder 90.

As shown in FIG. 1, the web segment 74 and arm segments 76, 78 form first and second receptacles 100, 102 for receiving and engaging half portions of two adjacent light modules 14. The lower edge 104 of each arm segment 76, 78 includes notches 106, 108 for receiving the light module tabs 110, 112 that are located in the light module half portions received in the receptacles 100, 102. In the example shown in the Figures, the light module 14 has three tabs on each side and the intermediate snap bracket has four notches 106, 108 each arm segment. The end notches 106 have a length 114 that is substantially one-half the length 116 of middle tab 110 and the intermediate notches 108 (i.e. the notches disposed intermediate the arm segment end portions and the web segment 74) have a length 118 that is substantially equal to the length 120 of the end tabs 112. Whereby, substantially half of each middle tab 110 of the adjacent light modules 14 are received in the end notches 106 and the end tabs 112 of the half portions are received in the intermediate notches 108 of the respective receptacle 100, 102.

Figure 6:
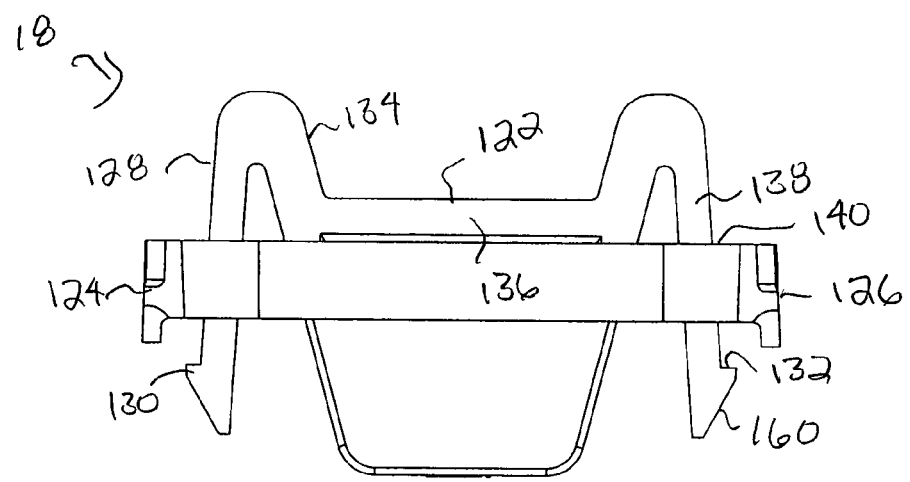
FIG. 6 is an end view of the end snap bracket of FIG. 5.

With reference to FIGS. 1, 5 and 6, the end snap brackets 18 have a construction that is similar to the intermediate snap brackets 16. Each end snap bracket 18 includes a web segment 122 connecting first and second arm segments 124, 126, with the arm segments 124, 126 being positioned such that the upper portion 50 of a light module 14 may be received therebetween. The web segment 122 includes a pair of downwardly extending resilient members 128, with a catch 130 extending laterally outward from each resilient member 128. An upper contact surface 132 of the catch 130 engages the rail shelf shoulder 90 when the end snap bracket 18 is installed. Each resilient member 128 may include an inner portion 134 extending upwardly from a center part 136 of the web segment 122, and an outer portion 138 extending downwardly from the inner portion 134 and through an opening 140 intermediate the web center part 136 and the arm segment 124, 126.

The web segment 122 and arm segments 124, 126 form a single receptacle 142 for receiving and engaging a half portion of the end light modules 14'. In the example shown in the Figures, the end snap bracket 18 has two notches 144, 146 each arm segment 124, 126, with the end notches 144 having a length 148 that is substantially one-half the length 116 of middle tab 110 and the intermediate notches 146 having a length 150 that is substantially equal to the length 120 of the end tabs 112. Substantially half of each middle tab 110 of the end light module 14' is received in the end notches 144 and the end tabs 112 of the half portion are received in the intermediate notches 146.

Figure 10:
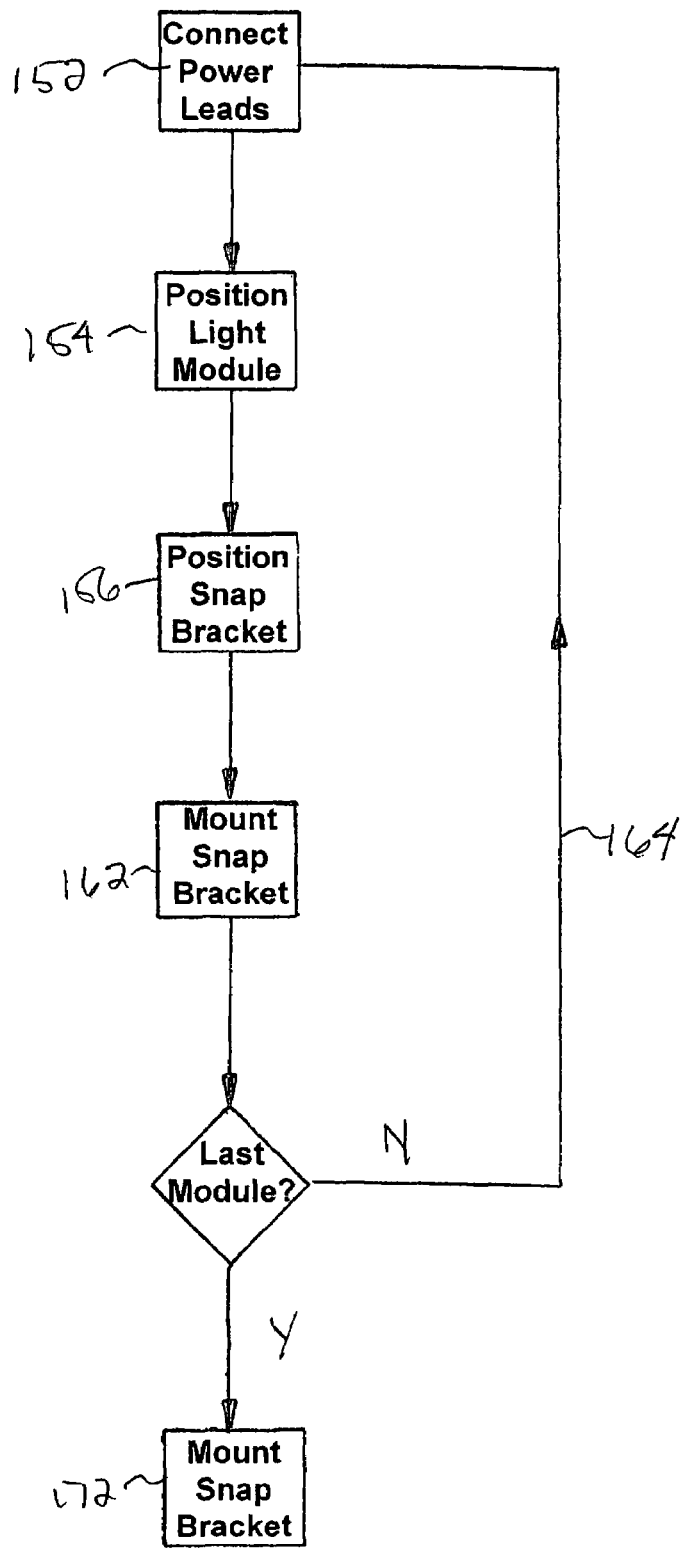
FIG. 10 is a flow diagram of a first method of making a light bar snap bracket assembly.

With reference to FIGS. 1, 9 and 10, the light bar snap bracket assembly 10 may be assembled by connecting 152 the wires 72 of a first light module 14 to the wiring harness 20. The light module 14 is positioned 154 by inserting the light module lower portion 52 through the rail channel outer portion 30, into the rail channel inner portion 32, until the lower surfaces 68 of the light module tabs 110, 112 engage the upper surface 70 of the rail shelves 36, 38. An end snap bracket 18 is positioned 156 such that the half portion of the light module proximate to the rail end is disposed intermediate the two arm segments 124, 126, with the end notches 144 located above the light module middle tabs 110 and the intermediate notches 146 located above the light module end tabs 112. Pushing the end snap bracket 18 toward the rail 12 engages the cam surfaces 160 of the resilient members 128 with the inner edge 62 of the rail shelves 36, 38, biasing the resilient member outer portions 138 towards the rail centerline 158. The end snap bracket 18 is mounted 162 by pushing the snap bracket 18 toward the rail 12, until the light module tabs 110, 112 are inserted into the respective end snap bracket notches 144, 146 and the catch contact surfaces 132 are disposed below the rail shoulder 90, whereby outer portions 138 of the resilient members 128 are biased away from the rail centerline 158 by the resilient member inner portions 134 and the catch contact surfaces 132 are disposed below the rail shoulders 90, locking the end light module end half portion to the rail 12.

If additional light modules 14 must be installed 164, the wires of the subsequent light module 14" are connected 152 to the wiring harness 20. The light module lower portion 52 is inserted 154 through the rail channel outer portion 30, into the rail channel inner portion 32, until the lower surfaces 68 of the light module tabs 110, 112 engage the upper surface 70 of the rail shelves 36, 38. An intermediate snap bracket 16 is positioned 156 such that the inner half portion 166 of the end light module 14 is disposed below the first receptacle 100 and the adjacent half portion 168 of the subsequent light module 14" is disposed below the second receptacle 102, with the end notches 106 located above the light module middle tabs 110 and the intermediate notches 108 located above the light module end tab 112. Pushing the intermediate snap bracket 16 toward the rail 12 engages the cam surfaces 86 of the resilient members 82 with the inner edge 62 of the rail shelves 36, 38, biasing the resilient member outer portions 96 towards the rail centerline 158. The intermediate snap bracket 16 is mounted 162 by pushing the snap bracket 16 toward the rail 12, until the light module tabs 110, 112 are inserted into the respective end snap bracket notches 106, 108 and the catch contact surfaces 88 are disposed below the rail shoulder 90, whereby outer portions 96 of the resilient members 82 are biased away from the rail centerline 158 by the resilient member inner portions 92 and the catch contact surfaces 88 are disposed below the rail shoulders 90, locking the end light module inner half portion 166 and the subsequent light module adjacent half portion 168 to the rail 12.

The wires 72 of each subsequent light module 14'", 14' are connected 152 to the wiring harness, the adjacent half portions of each subsequent light module 14'", 14' are mounted 154, 156, 162 to the rail 12 with intermediate snap brackets 16 as described above, and the end half portion 170 of the last light module 14' is mounted 172 to the rail 12 with a second end snap bracket 18 as described above.

Figure 11:
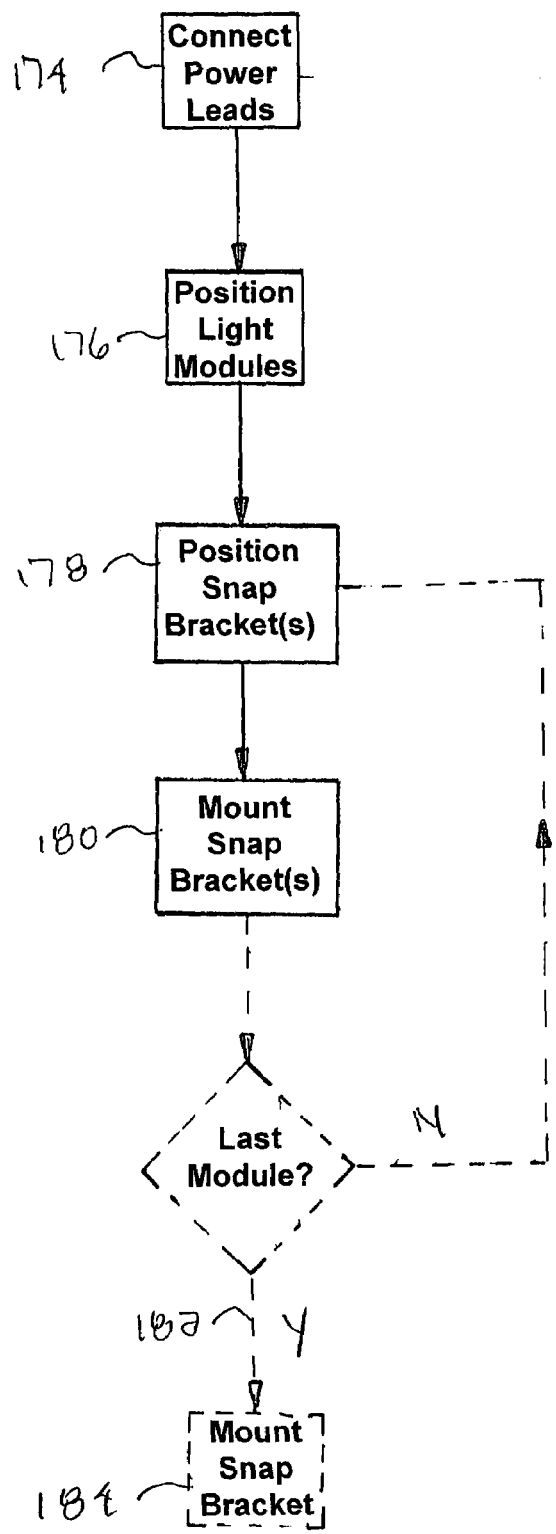
FIG. 11 is a flow diagram of a second method of making a light bar snap bracket assembly.

With reference to FIGS. 1, 9 and 11, the light bar snap bracket assembly 10 may also be assembled by connecting 174 the wires 72 of each light module 14 of the assembly 10 to the wiring harness 20. The light modules 14 are all positioned 176 by inserting the light module lower portion 52 through the rail channel outer portion 30, into the rail channel inner portion 32, until the lower surfaces 68 of the light module tabs 110, 112 engage the upper surface 70 of the rail shelves 36, 38. An end snap bracket 18 is positioned 178 such that the half portion of the light module proximate to the rail end is disposed intermediate the two arm segments 124, 126, with the end notches 144 located above the light module middle tabs 110 and the intermediate notches 146 located above the light module end tabs 112. The end snap bracket 18 is mounted 180 by pushing the snap bracket 18 toward the rail 12, until the light module tabs 110, 112 are inserted into the respective end snap bracket notches 144, 146 and the catch contact surfaces 132 are disposed below the rail shoulder 90.

Intermediate snap brackets 16 are consecutively positioned 178 such that the inner half portion 166 of the prior light module 14 is disposed below the first receptacle 100 and the adjacent half portion 168 of the subsequent light module 14" is disposed below the second receptacle 102, with the end notches 106 located above the light module middle tabs 110 and the intermediate notches 108 located above the light module end tab 112. Each intermediate snap bracket 16 is mounted 180 by pushing the snap bracket 16 toward the rail 12, until the light module tabs 110, 112 are inserted into the respective end snap bracket notches 106, 108 and the catch contact surfaces 88 are disposed below the rail shoulder 90, locking the remaining half portion of the prior light module inner half portion 166 and the subsequent light module adjacent half portion to the rail 12. After the last intermediate snap bracket is mounted 182, the end half portion 170 of the last light module 14' is mounted 184 to the rail 12 with a second end snap bracket 18.

In a variation of the second method, the wires 72 of all of the light modules 14 are connected 174 to the wiring harness 20 and the light modules 14 are positioned 176 in the rail 12, as described above, and then all of the snap brackets 16, 18 are mounted 180 to the rail 12 at the same time.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A light bar snap bracket assembly comprises:
    an elongated rail member including
        first and second sidewalls defining a channel extending from a first end of the rail member to a second end of the rail member,
        first and second, oppositely disposed shelves extending laterally from the sidewalls into the channel, each of the shelves having an upper surface and a lower shoulder;
    a plurality of light modules, each light module including
        oppositely disposed, longitudinally extending first and second sides, and
        at least one tab extending laterally from each side, each of the tabs having upper and lower surfaces,
        each light module defining first and second half portions, the second half portion extending longitudinally from the first half portion; and
    a plurality of snap brackets, each snap bracket including
        a web segment having
            oppositely disposed first and second ends,
            first and second resilient members disposed adjacent the first and second ends, respectively, and
            a catch extending laterally outward from each resilient member, and
        first and second arm segments extending substantially orthogonally from the first and second ends of the web segment, respectively, each of the arm segments having a lower edge defining at least one notch;
    wherein
        the light modules are disposed within the rail member channel in a line of light modules extending longitudinally from a first light module disposed at the first end of the rail member to a last light module disposed at the second end of the rail member, the line of light modules defining pairs of adjacent light modules, the lower surfaces of the tabs contacting the upper surfaces of the shelves, and
        one of the snap brackets is disposed intermediate each light module in each pair of light modules, one of the snap brackets is disposed intermediate the first light module and the first end of the rail member, and one of the snap brackets is disposed intermediate the last light module and the second end of the rail member, the first and second arm segments of each snap bracket extending longitudinally over the at least one tab of the first and second sides, respectively, of the light module half portion adjacent the snap bracket web segment, the tabs of the first and second light module sides being received within the notches of the first and second arm segments, respectively, the catches of the web segment resilient members engaging the lower shoulders of the rail member shelves whereby the snap brackets lock the light modules to the rail member.

2. The light bar snap bracket assembly of claim 1 wherein each light module includes:
    an upper portion;
    a lower portion; and
    a plurality of tabs extending laterally from the sides the light module intermediate the upper and lower portions.

3. The light bar snap bracket assembly of claim 1 wherein each of the snap bracket resilient members includes;
    an inner portion that extends upwardly from a center part of the web segment; and
    an outer portion that extends downwardly from the inner portion through an opening of the web segment.

4. The light bar snap bracket assembly of claim 3 wherein each of the snap bracket resilient members includes a cam surface extending obliquely downward from the catch.

5. The light bar snap bracket assembly of claim 4 wherein the snap brackets disposed intermediate each light module in each pair of light modules are H-shaped intermediate snap brackets, the first and second arm segments of each intermediate snap bracket having oppositely disposed first and second ends the web segment first and second ends being disposed at a position intermediate the first and second ends of the first and second arm segments, respectively.

6. The light bar snap bracket assembly of claim 5 wherein each of the arm segments has a first end notch extending longitudinally from the first end, a second end notch extending longitudinally from the second end, a first intermediate notch disposed intermediate the first end notch and the web segment, and a second intermediate notch disposed intermediate the second end notch and the web segment.

7. The light bar snap bracket assembly of claim 6 wherein each of the intermediate snap bracket notches has a length, each side of the light module has first and second end tabs and a middle tab disposed intermediate the end tabs, the intermediate snap bracket end notches having a length that is substantially one-half the length of the middle tabs, and the intermediate snap bracket intermediate notches having a length that is substantially equal to the length of the end tabs.

8. The light bar snap bracket assembly of claim 4 wherein the snap bracket disposed intermediate the first light module and the first end of the rail member and the snap bracket disposed intermediate the last light module and the second end of the rail member are each an end snap bracket, the first and second arm segments of each end snap bracket having oppositely disposed first and second ends the web segment first and second ends being disposed adjacent the first end of each arm segment.

9. The light bar snap bracket assembly of claim 8 wherein each of the arm segments has an end notch extending longitudinally from the first end and an intermediate notch disposed intermediate the end notch and the web segment.

10. The light bar snap bracket assembly of claim 9 wherein each of the end snap bracket notches has a length, each side of the light module has first and second end tabs and a middle tab disposed intermediate the end tabs, the end snap bracket end notch having a length that is substantially one-half the length of the middle tabs, and the end snap bracket intermediate notch having a length that is substantially equal to the length of the end tabs.

11. A method of manufacturing a light bar assembly, the light bar assembly having one or more light modules mounted to an elongated rail member by a plurality of snap brackets, each light module including oppositely disposed, longitudinally extending first and second sides, and at least one tab extending laterally from each side, each of the tabs having upper and lower surfaces, the rail member including first and second sidewalls defining a channel extending from a first end of the rail member to a second end of the rail member and first and second, oppositely disposed shelves extending laterally from the sidewalls into the channel, each of the shelves having an upper surface and a lower shoulder, each of the snap brackets including a web segment having oppositely disposed first and second ends, first and second resilient members disposed adjacent the first and second web segment ends, respectively, and first and second arm segments extending substantially orthogonally from the first and second ends of the web segment, respectively, each of the arm segments having a lower edge defining at least one notch, the method comprising:
  A) positioning a first of the light modules in the rail member channel adjacent the rail member first end, the lower surfaces of the light module tabs engaging the upper surface of the rail shelves;
  B) positioning a snap bracket between the rail member first end and the light module;
  C) pushing the snap bracket toward the rail member until the light module tabs are received by the snap bracket first and second arm segment notches and a catch extending laterally outward from each resilient member is disposed below the rail shoulder thereby installing the light module;
  D) determining whether a subsequent light module must be mounted to the rail member; and
  E) if a subsequent light module must be mounted to the rail member
    1) positioning the subsequent light module in the rail member channel adjacent the installed light module, the lower surfaces of the light module tabs engaging the upper surface of the rail shelves,
    2) positioning one of the snap brackets between the installed light module and the subsequent light module,
    3) pushing the snap bracket toward the rail member until the light module tabs of the installed light module and the subsequent light module are received by the snap bracket first and second arm segment notches and the catch of each resilient member is disposed below the rail shoulder thereby installing the subsequent light module, and
    4) performing step D; or
  F) if a subsequent light module must not be mounted to the rail member
    1) positioning one of the snap brackets between the rail member second end and the installed light module, and
    2) pushing the snap bracket toward the rail member until the light module tabs are received by the snap bracket first and second arm segment notches and the of each resilient member is disposed below the rail shoulder thereby completing manufacturing of the light bar assembly.

12. The method of claim 11 wherein the snap brackets include end snap brackets and intermediate snap brackets, the first and second arm segments of each end snap bracket having oppositely disposed first and second ends, the web segment first and second ends being disposed adjacent the first end of each arm segment, each of the arm segments having an end notch extending longitudinally from the first end and an intermediate notch disposed intermediate the end notch and the web segment, the step of positioning a snap bracket between the rail member first end and the light module comprising:
  aligning the first and second arm segments of one of the end snap brackets adjacent the first and second sides of the light module, respectively;
  locating the end notches above the light module middle tabs and the intermediate notches above the light module end tabs; and
  engaging a cam surface of the first resilient member with the rail member first shelf and a cam surface of the second resilient member with the rail member second shelf.

13. The method of claim 12 wherein the first and second arm segments of each intermediate snap bracket having oppositely disposed first and second ends, the web segment first and second ends being disposed at a position intermediate the first and second ends of the first and second arm segments, respectively, each of the arm segments having a first end notch extending longitudinally from the first end, a second end notch extending longitudinally from the second end, a first intermediate notch disposed intermediate the first end notch and the web segment, and a second intermediate notch disposed intermediate the second end notch and the web segment, the step of positioning one of the snap brackets between the installed light module and the subsequent light module comprising:
  aligning the first and second arm segments of one of the intermediate snap brackets adjacent the first and second sides of the installed light module and the subsequent light module, respectively;
  locating the end notches above the light module middle tabs and the intermediate notches above the light module end tabs; and
  engaging a cam surface of the first resilient member with the rail member first shelf and a cam surface of the second resilient member with the rail member second shelf.

14. A light bar snap bracket assembly comprises:
an elongated rail member including
  first and second sidewalls defining a channel extending from a first end of the rail member to a second end of the rail member,
  first and second, oppositely disposed shelves extending laterally from the sidewalls into the channel, each of the shelves having an upper surface and a lower shoulder;

a plurality of light modules, each light module including
oppositely disposed, longitudinally extending first and second sides,
first and second end tabs extending laterally from each side, and
a middle tab extending laterally from each side intermediate the end tabs,
each light module defining first and second half portions, the second half portion extending longitudinally from the first half portion; and
a plurality of intermediate snap brackets, each intermediate snap bracket including
a web segment having
oppositely disposed first and second ends,
first and second resilient members disposed adjacent the first and second ends, respectively, and
a catch extending laterally outward from each resilient member, and
first and second arm segments extending substantially orthogonally from the first and second ends of the web segment, respectively, each of the arm segments having
a lower edge defining at least one notch, and
oppositely disposed first and second ends the web segment first and second ends being disposed at a position intermediate the first and second ends of the first and second arm segments, respectively,
a plurality of end snap brackets, each end snap bracket including
a web segment having
oppositely disposed first and second ends,
first and second resilient members disposed adjacent the first and second ends, respectively, and
a catch extending laterally outward from each resilient member, and
first and second arm segments extending substantially orthogonally from the first and second ends of the web segment, respectively, each of the arm segments having a lower edge defining at least one notch, and
oppositely disposed first and second ends the web segment first and second ends being disposed adjacent the first end of each arm segment;
wherein
the light modules are disposed within the rail member channel in a line of light modules extending longitudinally from a first light module disposed at the first end of the rail member to a last light module disposed at the second end of the rail member, the line of light modules defining pairs of adjacent light modules, the lower surfaces of the tabs contacting the upper surfaces of the shelves, and
one of the intermediate snap brackets is disposed intermediate each light module in each pair of light modules, one of the end snap brackets is disposed intermediate the first light module and the first end of the rail member, and another one of the end snap brackets is disposed intermediate the last light module and the second end of the rail member, the first and second arm segments of each snap bracket extending longitudinally over the at least one tab of the first and second sides, respectively, of the light module half portion adjacent the snap bracket web segment, the tabs of the first and second light module sides being received within the notches of the first and second arm segments, respectively, the catches of the web segment resilient members engaging the lower shoulders of the rail member shelves whereby the snap brackets lock the light modules to the rail member.

15. The light bar snap bracket assembly of claim 14 wherein each of the snap bracket resilient members includes;
an inner portion that extends upwardly from a center part of the web segment; and
an outer portion that extends downwardly from the inner portion through an opening of the web segment.

16. The light bar snap bracket assembly of claim 15 wherein each of the snap bracket resilient members includes a cam surface extending obliquely downward from the catch.

17. The light bar snap bracket assembly of claim 14 wherein each of the intermediate snap bracket arm segments has a first end notch extending longitudinally from the first end, a second end notch extending longitudinally from the second end, a first intermediate notch disposed intermediate the first end notch and the web segment, and a second intermediate notch disposed intermediate the second end notch and the web segment.

18. The light bar snap bracket assembly of claim 17 wherein each of the intermediate snap bracket notches has a length, each side of the light module has first and second end tabs and a middle tab disposed intermediate the end tabs, the intermediate snap bracket end notches having a length that is substantially one-half the length of the middle tabs, and the intermediate snap bracket intermediate notches having a length that is substantially equal to the length of the end tabs.

19. The light bar snap bracket assembly of claim 14 wherein each of the end snap bracket arm segments has an end notch extending longitudinally from the first end and an intermediate notch disposed intermediate the end notch and the web segment.

20. The light bar snap bracket assembly of claim 19 wherein each of the end snap bracket notches has a length, each side of the light module has first and second end tabs and a middle tab disposed intermediate the end tabs, the end snap bracket end notch having a length that is substantially one-half the length of the middle tabs, and the end snap bracket intermediate notch having a length that is substantially equal to the length of the end tabs.

21. A method of manufacturing a light bar assembly, the light bar assembly having one or more light modules mounted to an elongated rail member by a plurality of snap brackets, each light module including oppositely disposed, longitudinally extending first and second sides, and at least one tab extending laterally from each side, each of the tabs having upper and lower surfaces, the rail member including first and second sidewalls defining a channel extending from a first end of the rail member to a second end of the rail member and first and second, oppositely disposed shelves extending laterally from the sidewalls into the channel, each of the shelves having an upper surface and a lower shoulder, each of the snap brackets including a web segment having oppositely disposed first and second ends, first and second resilient members disposed adjacent the first and second web segment ends, respectively, and first and second arm segments extending substantially orthogonally from the first and second ends of the web segment, respectively, each of the arm segments having a lower edge defining at least one notch, the method comprising:
A) positioning the light modules in the rail member channel, the lower surfaces of the light module tabs engaging the upper surface of the rail shelves;
B) positioning a snap bracket between the rail member first end and a light module disposed adjacent the rail member first end;

C) pushing the snap bracket toward the rail member until the light module tabs are received by the snap bracket first and second arm segment notches and a catch extending laterally outward from each resilient member is disposed below the rail shoulder thereby installing the light module;

D) determining whether a subsequent light module must be installed on the rail member; and E) if a subsequent light module must be installed on the rail member
  1) positioning one of the snap brackets between the installed light module and the subsequent light module,
  2) pushing the snap bracket toward the rail member until the light module tabs of the installed light module and the subsequent light module are received by the snap bracket first and second arm segment notches and the catch of each resilient member is disposed below the rail shoulder thereby installing the subsequent light module, and
  3) performing step D; or F) if a subsequent light module must not be installed on the rail member
  1) positioning one of the snap brackets between the rail member second end and the installed light module, and
  2) pushing the snap bracket toward the rail member until the light module tabs are received by the snap bracket first and second arm segment notches and the of each resilient member is disposed below the rail shoulder thereby completing manufacturing of the light bar assembly.

22. A method of manufacturing a light bar assembly, the light bar assembly having one or more light modules mounted to an elongated rail member by a plurality of snap brackets, each light module including oppositely disposed, longitudinally extending first and second sides, and at least one tab extending laterally from each side, each of the tabs having upper and lower surfaces, the rail member including first and second sidewalls defining a channel extending from a first end of the rail member to a second end of the rail member and first and second, oppositely disposed shelves extending laterally from the sidewalls into the channel, each of the shelves having an upper surface and a lower shoulder, each of the snap brackets including a web segment having oppositely disposed first and second ends, first and second resilient members disposed adjacent the first and second web segment ends, respectively, and first and second arm segments extending substantially orthogonally from the first and second ends of the web segment, respectively, each of the arm segments having a lower edge defining at least one notch, the method comprising:

A) positioning the light modules in the rail member channel, the lower surfaces of the light module tabs engaging the upper surface of the rail shelves, the light modules defining a line of light modules extending longitudinally from a first light module disposed at the first end of the rail member to a last light module disposed at the second end of the rail member, the line of light modules defining pairs of adjacent light modules;

B) positioning a snap bracket between the rail member first end and the first light module;

C) positioning one of the snap brackets between the light modules in each pair of light modules D) positioning a snap bracket between the rail member second end and the last light module;

E) pushing the snap brackets toward the rail member until the light module tabs are received by the snap bracket first and second arm segment notches and a catch extending laterally outward from each resilient member is disposed below the rail shoulder thereby installing the light modules.

* * * * *

UNITED STATES PATENT AND TRADEMARK OFFICE
CERTIFICATE OF CORRECTION

PATENT NO.         : 7,404,658 B1                                      Page 1 of 1
APPLICATION NO. : 11/879840
DATED              : July 29, 2008
INVENTOR(S)        : Lyons et al.

It is certified that error appears in the above-identified patent and that said Letters Patent is hereby corrected as shown below:

<u>Column 10</u>:

Line 8, delete "the of each" and insert --the catch of each--.

<u>Column 13</u>:

Line 29, delete "the of each" and insert --the catch of each--.

Signed and Sealed this

Twenty-first Day of October, 2008

JON W. DUDAS
*Director of the United States Patent and Trademark Office*